US009571791B1

(12) United States Patent
Castellani et al.

(10) Patent No.: US 9,571,791 B1
(45) Date of Patent: Feb. 14, 2017

(54) IMPORTING OF INFORMATION IN A COMPUTING SYSTEM

(71) Applicant: International Business Machines Corporation, Armonk, NY (US)

(72) Inventors: Marzia E. Castellani, Zagarolo (IT); Ana L. Medina, Twickenham (GB); Ciro Ragusa, Rome (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/156,639

(22) Filed: May 17, 2016

(51) Int. Cl.
*H04N 7/15* (2006.01)
*G06F 3/0488* (2013.01)

(52) U.S. Cl.
CPC .............. *H04N 7/15* (2013.01); *G06F 3/0488* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,124,950 A * | 9/2000 | Honda | ............... | H04N 1/00795 358/464 |
| 7,712,017 B2 * | 5/2010 | Chiu | .................. | H04N 1/00318 345/207 |
| 8,040,369 B1 * | 10/2011 | Gargan | .................... | H04N 1/42 348/14.01 |
| 8,611,667 B2 | 12/2013 | Wilson et al. | | |
| 2013/0191366 A1 * | 7/2013 | Jovanovic | .......... | G06K 9/00469 707/710 |
| 2015/0347719 A1 * | 12/2015 | Pathak | .................... | G06F 21/10 726/28 |

(Continued)

FOREIGN PATENT DOCUMENTS

EP 0622722 2/1994

OTHER PUBLICATIONS

RGB & GIS High Definition Scanning Systems, Retrieved on Apr. 1, 2016, Retrieved from: http://www.lumiere-technology.com/Pages/Products/Product1.htm, 2 pages.

(Continued)

*Primary Examiner* — Joseph J Nguyen
(74) *Attorney, Agent, or Firm* — Schmeiser, Olsen & Watts, LLP; Michael A. Petrocelli

(57) ABSTRACT

A method and system for importing information in a computing system. An information content is displayed on one or more respective screens in corresponding locations. An import request, for importing a digital representation of a physical object placed on a current screen in a current location, is received. A first digital image at least partially representing the current screen is acquired by one or more digital cameras. An object digital image representing an object area of the current screen being covered by the physical object is obtained. The object area is identified from comparison between the first digital image and a displayed digital image. A digital document representing the physical object is generated from the object digital image. The digital document is added to the information content for displaying the digital document at a position on each screen corresponding to a position of the physical object on the current screen.

19 Claims, 7 Drawing Sheets

(56) References Cited

U.S. PATENT DOCUMENTS

2016/0088178 A1* 3/2016 Hansen .................. H04N 1/028
       358/479

OTHER PUBLICATIONS

Husek, Jakub, Multi-touch Table with Image Capturing, Proceedings of CESCG 2011: the 15th Central European Seminar on Computer Graphics, 8 pages.

CamScanner—Phone PDF Creator, Android Apps on Google Play, Retrieved on Oct. 13, 2015, Retrieved from: https://play.google.com/store/apps/details?id=com.instig.camscanner&hl=en, 4 pages.

CamScanner—Phone PDF Creator, Top Developer, 758,907, INSTIG Information Co., Ltd Productivity, 2016 Google, Retrieved from: https://play.google.com/store/apps/details?id=com.instig.camscanner&hl=en, 19 pages.

* cited by examiner

IMPORTING OF INFORMATION IN A COMPUTING SYSTEM

TECHNICAL FIELD

The present invention relates to data processing, and more specifically, to an importing of information in a computing system.

BACKGROUND

Computing systems are routinely used to process a variety of information (such as to report, analyze, sort, aggregate the information). For example, computing systems may run collaborative applications that are designed to help persons involved in common tasks to achieve goals (such as to facilitate team working in modern organizations). Generally, the collaborative applications are used by persons in different locations (and particularly in remote locations that are dispersed geographically) to engage the collaborative applications in cooperative work. A typical example of a collaborative application is a tele-conference. The tele-conference allows persons participating in the tele-conference in different conference rooms to discuss topics of common interest by means of tele-communication techniques. For this purpose, each participant may speak in the tele-conference so as to be heard by all the other participants in the teleconference, which is generally accompanied by transmission of images relating to activities at the different locations (for example, an image of the participant that is currently speaking). Moreover, the tele-conference also allows sharing information among participants in the teleconference to support the discussion in the teleconference. For example, shared documents (such as texts) may be displayed to all of the participants. Each participant may also have a possibility of editing the shared documents, with every change in the shared documents propagated to all of the other participants. The video-conference brings the participants together virtually, without having the participants meet physically (thereby cutting travel costs).

The information processed in any computing system (including the information shared in any tele-conference) is in digital form. This information may be generated directly in digital form (for example, in case of word processor documents, spreadsheets, computer-graphic drawings). Otherwise, any physical object (i.e., a digital representation thereof) is to be imported in the computing system for allowing the physical object's processing. For example, a paper document may be scanned to obtain a digital image thereof, which is then saved in a corresponding digital document. However, the importing of the physical objects may be difficult. Indeed, the equipment required for the importing of the physical objects may be not available locally (or the required equipment may be not available at all).

Alternatively, "Multi-touch Table with Image Capturing, Jakub Husek, Proceedings of CESCG 2011: The 15th Central European Seminar on Computer Graphics" discloses a multi touch screen with an ability of taking pictures through the screen. U.S. Pat. No. 8,611,667 discloses a projection-vision system employing a camera and a projector (sitting off to the side of a projection surface) that can detect when an object is present on the projection surface, capture an image thereof and subsequently project the image back on the projection surface or onto other remotely connected display surfaces. EP-A-0622722 discloses a system for generating new documents from originals, wherein a camera captures various manual operations carried out by the user on an original paper document (representing manipulations of the document's text or images), and feedback to the user is provided by projection of an image onto the original paper document.

In any case, importing the physical objects is not completely natural and not intuitive. As a result, operations required to import the physical objects may be relatively time consuming (especially during a learning phase thereof), which is particularly annoying in case of a tele-conference. Indeed, in the tele-conference, the participants interact substantially in real-time. Therefore, any delay caused by importing a physical object may cause a corresponding stop of the tele-conference.

SUMMARY

The present invention provides a method, and associated system and computer program product, for importing information in a computing system. An information content being stored in the computing system is displayed on each screen of one or more screens of the computing system provided in corresponding locations. An import request by the computing system is received in a current location for importing a digital representation of a physical object placed on a current screen of the one or more screens in the current location. A first digital image at least partially representing the current screen is received by one or more digital cameras arranged above the current screen in the current location. An object digital image representing an object area of the current screen being covered by the physical object is obtained, wherein the object area is identified according to a comparison between the first digital image and a displayed digital image being displayed by the current screen at an acquisition instant of the first digital image. A digital document representing the physical object is generated from the object digital image. The digital document is added to the information content for displaying the digital document on each screen of the one or more screens in correspondence to a position of the physical object on the current screen.

DETAILED DESCRIPTION

Participation in video-conferences may be made far more intuitive and rapid by the use of touch-screen tables provided in the conference rooms. Each touch-screen table comprises a relatively big interactive touch-screen embedded in a table. The touch-screen displays images and at the same time allows entering inputs relating to the displayed images by corresponding gestures that are implemented by touching the touch-screen (for example, to click virtual buttons, scroll documents, zoom images), which allows interacting with the touch-screen in a substantially natural way.

In general terms, the present invention is based on importing a physical object placed on a screen by one or more digital cameras arranged above the screen.

An aspect of the present invention provides a method for importing information in a computing system that comprises obtaining an object digital image (representing an object area of a screen of the computing system that is covered by a physical object placed thereon), wherein the object area is identified according to a comparison between a first digital image (acquired by one or more digital cameras arranged above the screen, at least partially) and a displayed digital image which may, in one embodiment, be displayed by the screen at an acquisition instant of the first digital image. An acquisition instant of the first digital image is defined as a time at which the scan image is generated.

A further aspect of the present invention provides a software program and a computer program product for implementing methods of the present invention.

Figure 1:
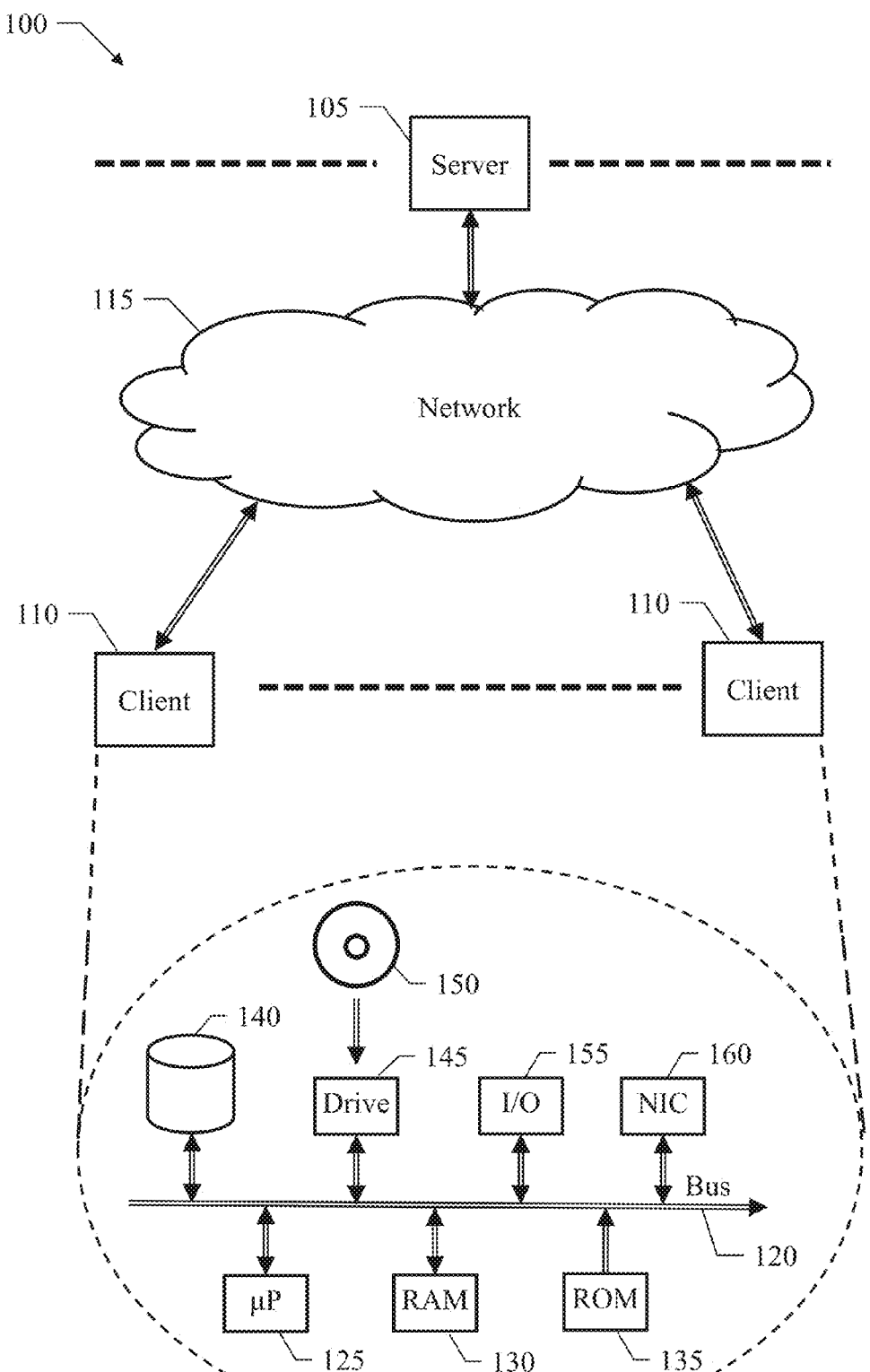
FIG. 1 shows a pictorial representation of a computing infrastructure that may be used to practice embodiments of the present invention.

FIG. 1 shows a pictorial representation of a computing infrastructure 100 that may be used to practice embodiments of the present invention.

The computing infrastructure 100 has a distributed architecture, wherein a server computing machine (or server) 105 and a plurality of client computing machines ("clients" denote the client computing machines) 110 communicate over a network 115 (for example, Internet based). The server 105 offers a tele-conference service to the clients 110, which is provided in corresponding conference rooms which may be dispersed geographically so as to be remote one to another. The tele-conference service may be exploited by users of the clients 110 (referred to as participants) to participate to tele-conferences, and particularly web-conferences when implemented over the Internet (e.g., to discuss topics of common interest).

The computing machines 105,110 of each server/client combination comprise several units that are connected in parallel to a bus structure 120 (with an architecture that is suitably scaled according to the actual function of the computing machine 105,110). For example, the server 105 may be part of a server farm (not shown in FIG. 1) and each client 110 is implemented by a touch-screen table. In detail, one or more microprocessors (P) 125 control operation of the computing machine 105,110. A RAM 130 is used as a working memory by the microprocessors 125, and a ROM 135 stores basic code for a bootstrap of the computing machine 105,110. The computing machine 105,110 is also provided with a mass-memory comprising one or more hard-disks 140 (implemented by storage devices of the server farm for the server 105) and drives 145 for reading/writing removable storage units; for example, optical disks 150 like DVDs (implemented by a console of the server farm for the server 105). Moreover, the computing machine 105,110 has input/output (I/O) units 155 (for example, a keyboard, a mouse and a monitor); particularly, in the case of the server 105 the input/output units 155 are implemented by the console of the server farm, whereas in the case of each client 110 the input/output units 155 comprise a touch-screen of the client's touch-screen table. A network adapter (NIC) 160 is used to connect the computing machine 105, 110 to the network 115.

FIGS. 2A-2G show general principles according to embodiments of the present invention.

Figure 2A:
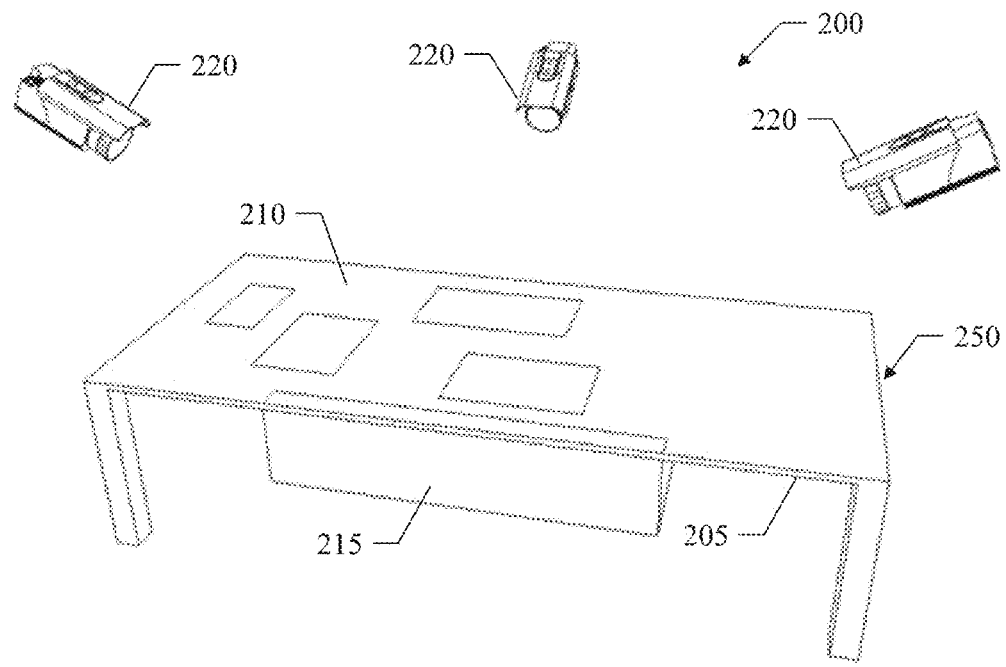
FIGS. 2A-2G show general principles according to embodiments of the present invention.

Starting from FIG. 2A, each conference room 200 comprises a corresponding touch-screen table 250. The touch-screen table 250 is formed by a desk 205, which has a top plate suspended horizontally at a height allowing every participant in the tele-conferences to sit in front of the desk 205 (for example, by four legs provided at corners of the desk 205). A touch-screen 210 is embedded in the top plate of the desk 205, so as to extend substantially horizontally. A personal computer 215 provided under the top plate of the desk 205 implements all the other components of the touch-screen table 250.

The touch-screen 210 comprises a display panel (for example, of LCD type) for displaying images and a sensing plate (for example, of capacitive type) for entering inputs relating to the displayed images by corresponding gestures that are implemented by touching the sensing plate. In one embodiment, the touch-screen 210 is of a multi-touch type so as to support both simple-touch gestures and multi-touch gestures. The simple-touch gestures are implemented by single touches of the touch-screen 210 (for example, clicking virtual buttons, scrolling digital documents, dragging images). The multi-touch gestures are instead implemented by multiple touches at once of the touch-screen 210 (for example, pinching an image to zoom it in and out, moving the fingers clockwise/counterclockwise to rotate an image). During any tele-conference, the touch-screen 210 may display a command frame with a menu for entering commands relating thereto (for example, start/end, intervene) and a virtual keyboard for entering text (for example, a message for the participants). Moreover, the touch-screen 210 displays a document frame containing one or more digital documents that are shared among the participants in the tele-conference. The shared (digital) documents are displayed in the same way on the touch-screens of all the participants and the shared documents may be manipulated on the touch-screen of any (authorized) participant (for example, to add hand-written notes).

In an embodiment of the present invention, the conference room 200 further comprises one or more digital cameras 220 (three digital cameras in the example in FIG. 2A), which are arranged above the touch-screen 210 (for example, mounted on a ceiling of the conference room 200, not shown in FIG. 2A). Each digital camera 220 comprises a high number of sensors (for example, an array of 1.000-20.000 CCDs), which allow acquiring digital images at very high resolution (for example, of the order of 1.000-20.000×1.000-20.000 pixels), The digital cameras 220 are steerable to scan large areas (for example, up to 1-5×1-5 m) or to point and zoom to specific small areas.

Figure 2B:
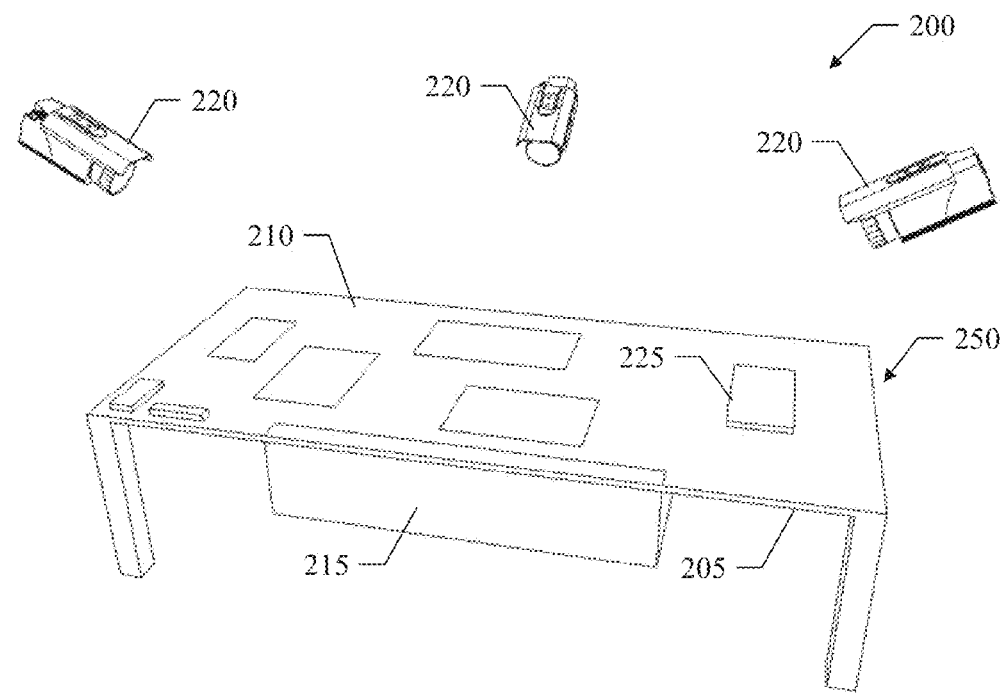

Moving to FIG. 2B, a physical object, for example, a paper document 225 present in the conference room 200 is to be imported in the tele-conference (for being shared with the other participants in the tele-conference). A participant in the tele-conference in the conference room 200 places the paper document 225 onto the touch-screen 210 In one embodiment, and the paper document 225 is placed with a side of the document 225 containing relevant information facing upwards at a desired position in the document frame. At this point, the participant enters an import request (for importing the paper document 225 in the tele-conference) by selecting a corresponding command in the command frame (for example, by clicking on a dedicated virtual button). In response thereto, a digital image representing the touch-screen 210 or a part thereof, referred to as scan (digital) image, is acquired by the digital cameras 220. A digital image representing an object area of the touch-screen 210 that is covered by the paper document 225, referred to as object (digital) image, is then obtained. The object area is identified according to a comparison between a scan image (see description of scan image FIG. 2C) and the digital image that is displayed by the touch-screen 210 at an acquisition instant of the scan image. The digital image is referred to as a displayed (digital) image. This resulting digital image may be achieved in different ways.

Figure 2C:
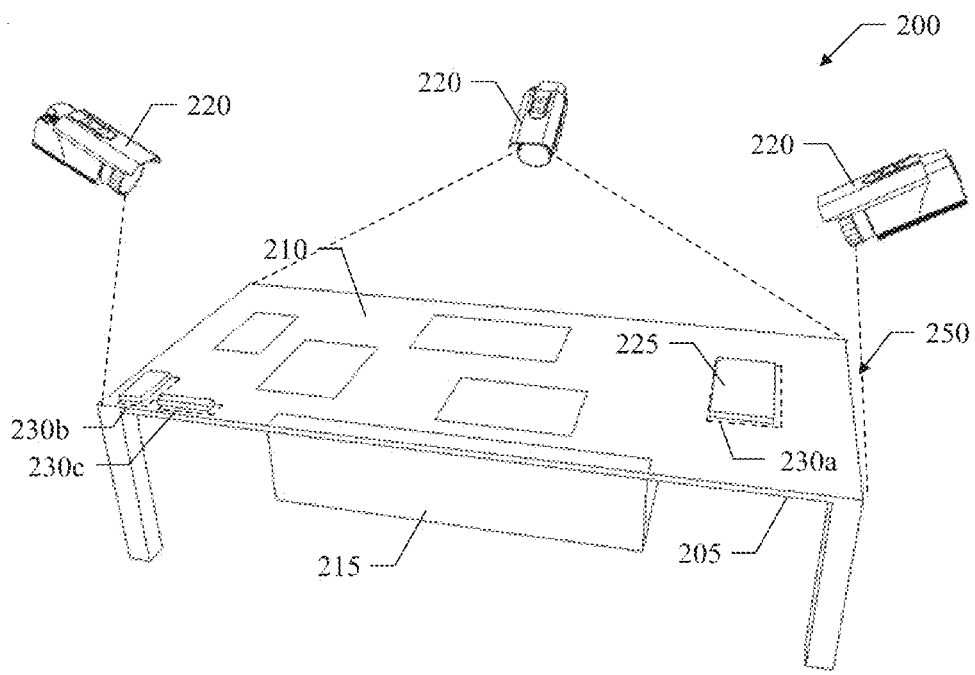

Moving to FIG. 2C, in a semi-automatic mode, the scan image is acquired by the digital cameras 220 to represent the whole touch-screen 210 (or at least the document frame). One or more candidate areas (for the object area of the paper document 225) are identified by comparing the scan image with the displayed image. Particularly, the candidate areas are identified by portions of the scan image that differ from the corresponding portions of the displayed image, which means that the corresponding areas of the touch-screen 210 are covered by physical objects, so that these physical objects are represented in the scan image instead of the corresponding portions of the displayed image. In the example in FIG. 2C, a candidate area 230a is identified for the paper document 225 (to be imported in the tele-conference) and two other candidate areas 230b and 230c are identified for other physical objects that may be present on the touch-screen 210 (for example, a pen or a sheet for use locally in the conference room 200). A visual mark (represented by a broken line) is then displayed on the touch-screen 210 near each candidate area 230a-230c to prompt the participant to select (or confirm) the object area 230a corresponding to the paper document 225 (for example, by clicking on the visual mark).

Figure 2D:
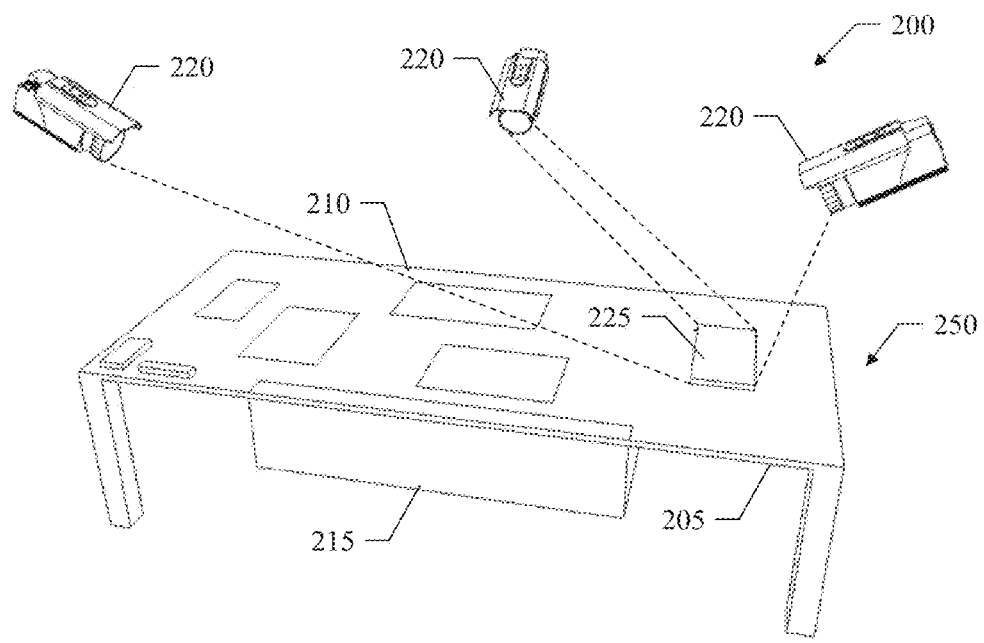

Moving to FIG. 2D, the object image is now acquired by the digital cameras 220 to represent the object area that has been identified above.

Figure 2E:
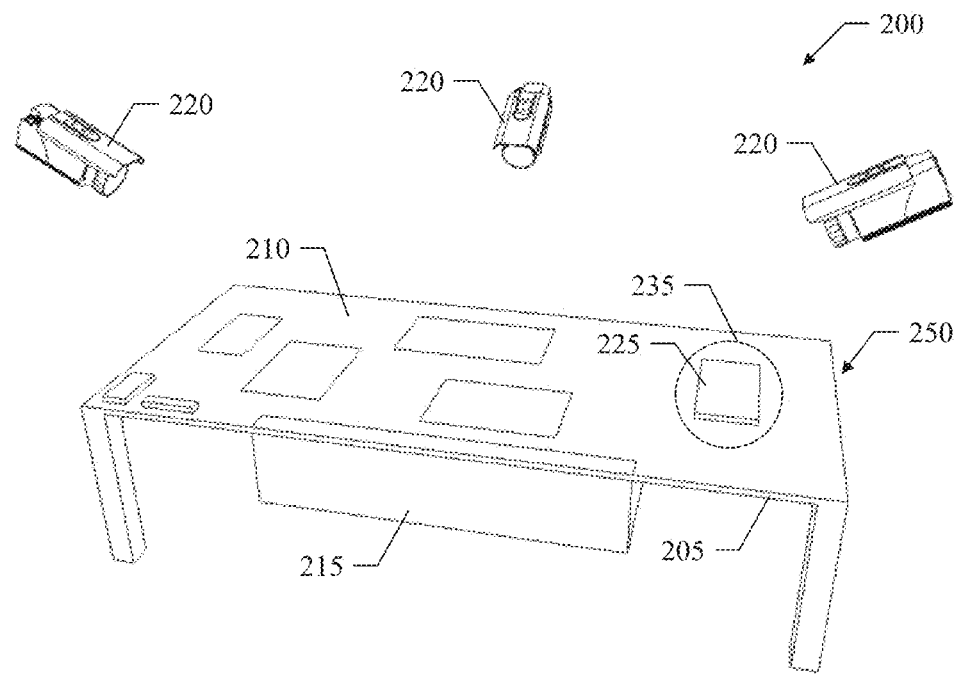

Moving to FIG. 2E, in a manual mode the participant is instead prompted to select a scan area 235 of the touch-screen 210 that encloses the paper document 225 (for example, by drawing a line roughly around it).

Figure 2F:
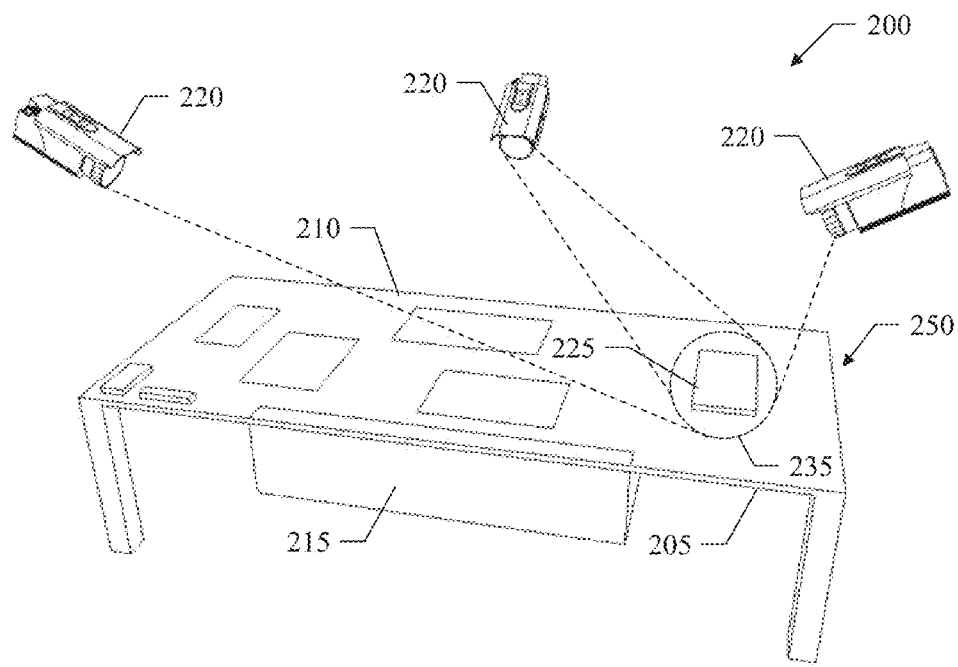

Moving to FIG. 2F, the scan image is acquired by the digital cameras 220 to represent the scan area 235 only. The object area covered by the paper document 225 is now identified by comparing the scan image with the corresponding portion of the digital image as above (with the object area that is identified by the portion of the scan image that differs from the displayed image, meaning that the object area is covered by the paper document 225 so that the paper document is represented in the scan image instead of the corresponding portion of the displayed image). The object image is then obtained from the representation of the object area in the scan image.

Figure 2G:
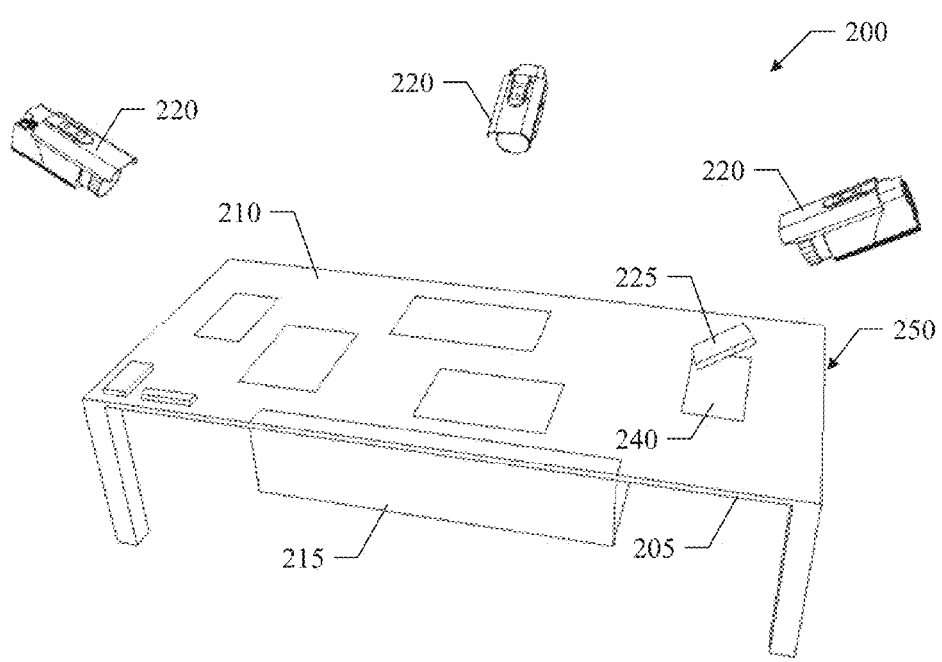

Moving to FIG. 2G, independent of how the object image has been obtained, a new digital document representing the paper document 225 is generated from the object image. The new digital document is added to the shared documents of the tele-conference (if any). As a result, the new digital document is displayed in the document frame of the touch-screens of all the participants in the tele-conference, in correspondence to the position of the paper document 225 on the touch-screen 210. Therefore, as soon as the participant in the conference room 200 removes the paper document 225 from the touch-screen 210, the representation of the new digital document matching the paper document 225 (denoted with the reference 240) appears below it. The new digital document 240 may now be manipulated as usual in the tele-conference (by any authorized participant).

The above-described solution makes the importing of the paper document in the tele-conference very natural and then intuitive. Indeed, for this purpose the paper document is placed onto the touch-screen exactly in the same way as if the paper document was added to a table with physical objects corresponding to the shared documents displayed thereon. Once the paper document is removed, the touch-screen automatically displays the corresponding digital representation, which results in a very user-friendly experience. Indeed, the content of the paper document appears to be sucked by the touch-screen thereby passing from the real world (the paper document) to the virtual world (the new digital document) seamlessly, with the impression of peeling off a transparent film when the paper document is removed from the touch-screen table, which significantly reduces the time required to import the paper document, especially when the participant is not expert (since a corresponding learning curve is far steeper). These advantages are especially perceived in the tele-conference. Indeed, the importing of the paper document may be performed substantially in real-time without any impact (or at most with a very short delay) on progress of the importing of the paper document.

Figure 3:
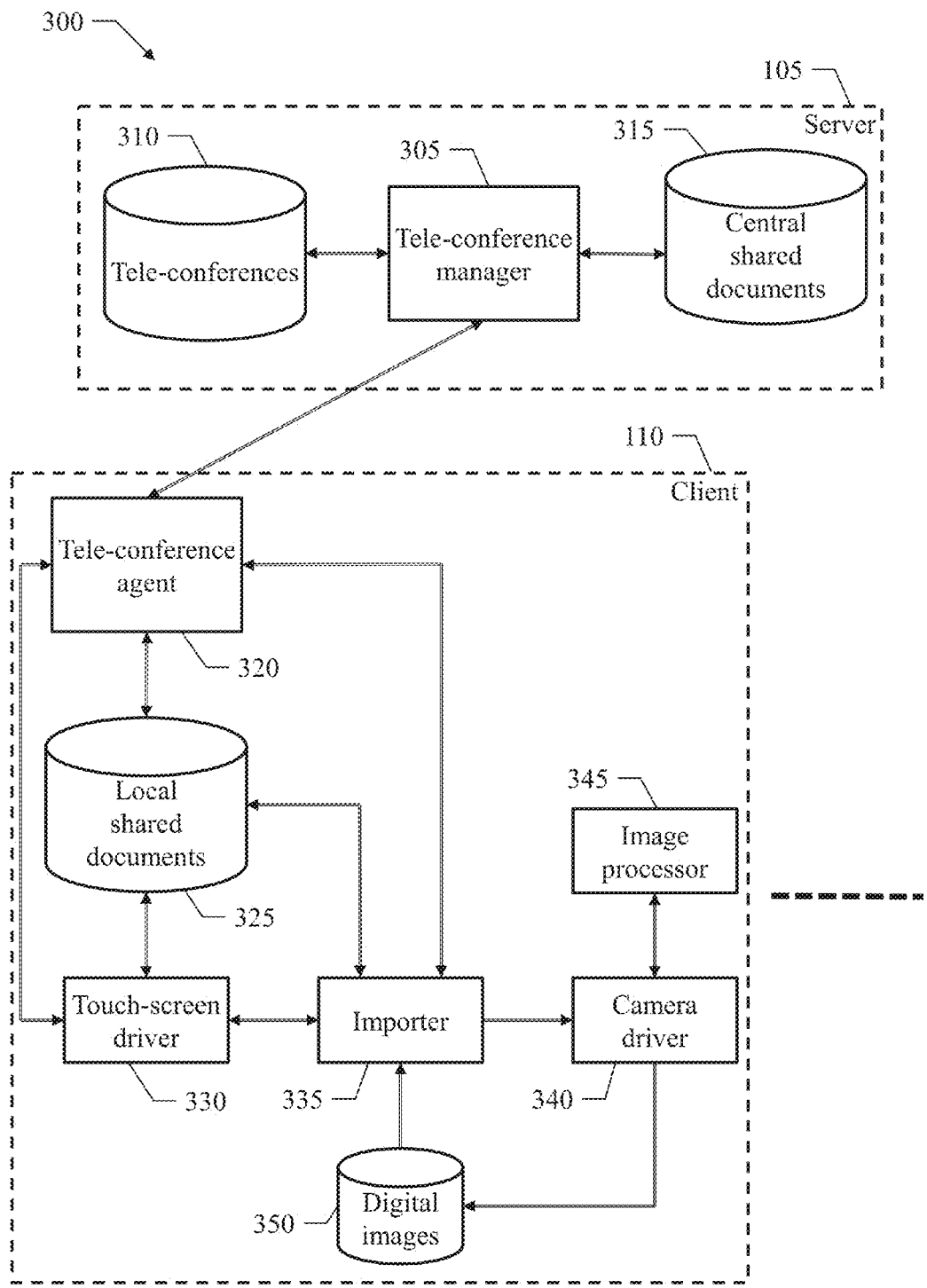
FIG. 3 shows software components that may be used to implement embodiments of the present invention.

FIG. 3 shows software components that may be used to implement embodiments of the present invention.

Particularly, all of the software components (programs and data) are denoted collectively by reference 300. The software components 300 may be stored in the mass memory and loaded (at least partially) into the working memory of each computing machine when the programs are running, together with an operating system and other application programs (not shown in FIG. 3). The programs may be initially installed into the mass memory, for example, from removable storage units or from the network. Each program may be a module, segment or portion of code, which comprises one or more executable instructions for implementing the specified logical function.

The server 105 and the clients 110 (only one shown in FIG. 3) run a tele-conference application, which comprises a server-side component implemented on the server 105 and a client-side component implemented on each client 110.

Particularly, the server 105 runs a tele-conference manager 305 offering the tele-conference service to the users of the clients 110. For this purpose, the tele-conference manager 305 controls (in read/write mode) a tele-conference repository 310. The tele-conference repository 310 may store control information of each tele-conference that is in progress (for example, participants in the tele-conference with their roles, credentials, network addresses of the clients). Moreover, the tele-conference manager 305 controls (in read/write mode) a central shared document repository 315, which stores a central version of the shared documents of each tele-conference that is in progress (for example, each shared document in a corresponding file associated with an indication of position and orientation of the shared document on the touch-screens of the participants in the tele-conference).

Each client 110 runs a tele-conference agent 320 controlling each tele-conference that is in progress locally. For this purpose, the tele-conference agent 320 interacts (remotely) with the tele-conference manager 305. Moreover, the tele-conference agent 320 controls (in read/write mode) a local shared document repository 325, which stores a local version of the shared documents of the tele-conference (synchronized with a central version of the shared documents of the tele-conference stored in the central shared document repository 315), together with a corresponding definition of the displayed image that is currently displayed on the touch-screen of the client 110 (not shown in FIG. 3). A touch-screen driver 330 drives the touch-screen. For this purpose, the touch-screen driver 330 further controls (in read/write mode) the local shared document repository 325 (in mutual exclusion with the tele-conference agent 320). Moreover, the touch-screen driver 330 interacts with the tele-conference agent 320.

According to an embodiment of the present invention, the client 110 runs an importer 335 controlling the importing of any physical objects in the tele-conference. For this purpose, the importer 335 interacts with the touch-screen driver 330 and with the tele-conference agent 320. The importer 335 controls (in read/write mode) the local shared document repository 325 (in mutual exclusion with the tele-conference agent 320 and the touch-screen driver 330). Moreover, the importer 335 controls a camera driver 340, which drives the digital cameras of the client 110 (not shown in FIG. 3). The camera driver 340 interacts with an image processor 345 implementing pre-processing and post-processing operations for the digital images that are acquired by the digital cameras. The camera driver 340 controls (in write mode) a digital image repository 350, which stores each digital image that has been acquired by the digital cameras. The digital image repository 350 is accessed (in read mode) by the importer 335.

Figure 4:
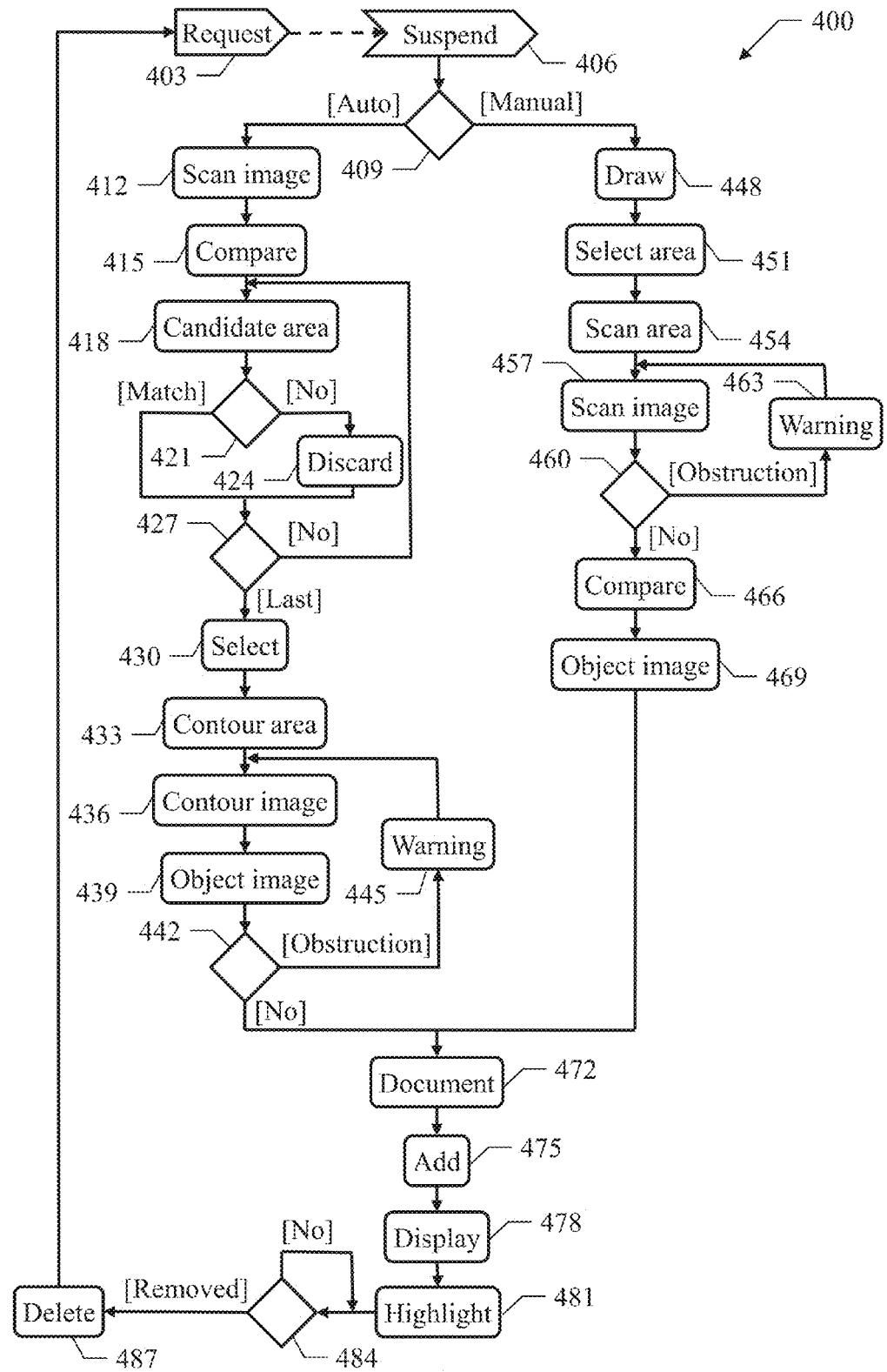
FIG. 4 shows an activity diagram describing a flow of activities relating to an implementation of embodiments of the present invention.

FIG. 4 shows an activity diagram describing a flow of activities relating to an implementation of embodiments of the present invention.

Particularly, the diagram of FIG. 4 represents an exemplary process (which may be used to import physical objects, such as paper documents, in a tele-conference that is in progress in a conference room) in accordance with a method 400. In this respect, each block in FIG. 4 may correspond to one or more executable instructions for implementing the specified logical function in the computing systems of server 105 and clients 110 in FIG. 1.

Starting from block 403, the importer 335 is listening for the submission of any import request (for importing a paper document previously placed on the touch-screen) by a participant to the tele-conference. The process passes to block 406 as soon as the importer receives a notification from the touch-screen driver that a (new) import request has been submitted (for example, when the importer detects the clicking of a corresponding virtual button displayed in the command frame). At this point, the importer notifies the tele-conference agent that the importing of the paper document has started, so as to cause the tele-conference agent to suspend any update of the shared documents on the touch-screens of all the participants to the tele-conference. In this way, the digital image that is currently displayed on all of the touch-screens (comprising the touch screen wherein the import request has been submitted) is frozen to define the displayed image to be used to identify the object area on which the paper document has been placed. The flow of activity then branches at block 409 according to a configuration of the importer. Particularly, a branch formed by the blocks 412-445 is followed when the importer is configured for operating in the semi-automatic mode whereas a branch formed by the blocks 448-469 is followed when the importer is configured for operating in the manual mode, with the two branches merging at block 472.

With reference to block 412 (semi-automatic mode), the importer commands the camera driver to acquire a (new) scan image of the whole touch-screen. For example, each digital camera is steered and focused to acquire a digital image representing a corresponding portion of the touch-screen, identified by markers (for example, of reflective type) arranged at known positions. The digital image is defined by a bitmap comprising a matrix of cells, each cell storing the value of a respective pixel (i.e., a basic picture element representing a basic portion of the touch-screen). Typically, the pixel value comprises three elements (for example, each element having 8 bits) providing its Red, Green and Blue (RGB) components. The image processor determines various parameters of the digital image (such as a high-frequency content and an average luminosity), which are used to control operation of the digital camera automatically (for example, the digital camera's focus and exposure). The image processor also modifies the digital image to improve the digital image's quality (for example, applying a white-balance algorithm, correcting exposure problems, reducing a noise) and to compensate a perspective representation of the digital image. At this point, the image processor combines the digital images acquired by the different digital cameras into the desired scan image (so as to represent the whole touch-screen). The camera driver then stores the scan image so obtained into the digital image repository. The digital images acquired by the digital cameras, and then the resulting scan image, have a relatively low resolution (for example, 1-10% of a maximum resolution of the digital cameras, such as 50-400×50-400 pixels). In this way, the scan image may be obtained in a relatively short time (for example, a few seconds) even when the touch-screen is relatively large (so as to limit impact of the scan image on the progress of the tele-conference). At the same time, the low resolution of the scan image does not create any problem since the scan image is only used to identify the object area (whereas the corresponding object image is acquired later on).

Passing to block 415, the importer compares the scan image (extracted from the digital image repository) with the displayed image (extracted from the local shared document repository) to identify any candidate areas of the touch-screen covered by physical objects. For example, a smoothing algorithm is applied to the scan image to compensate any possible misalignment thereof with respect to the displayed image (for example, a moving average filter). The scan image and the displayed image are then sub-sampled to make the scan image and the displayed image the same size. The scan image and the displayed image are possibly further sub-sampled to improve the robustness and to reduce the computation time (by partitioning the scan/displayed images into groups of cells and calculating an aggregated value for each one of the scan/displayed images, for example, as the average of the pixel values of the scan/displayed images). A comparison mask is generated. The comparison mask is defined by a matrix of cells with the same size as the scan/displayed images, with each cell storing a flag (i.e., a binary value) that is asserted (for example, at the logic value 1) when the corresponding pixel value of the scan image significantly differs from the corresponding pixel value of the displayed image (i.e., the difference in the respective pixel values exceeds a threshold, for example, equal to 0-2% of a maximum value thereof) or it is deasserted (for example, at the logic value 0) otherwise. At this point, the comparison mask is scanned to detect every group of adjacent cells whose flag is asserted. An identifier of each group of adjacent cells that is detected (for example, defined by the coordinates of its upper-left cell) is then saved into a candidate area list. The full-size of the comparison mask corresponding to the original size of the displayed image is restored by replicating the flag of each cell of the (sub-sampled) comparison mask in all the corresponding cells of the (full-size) comparison mask. At the same time, the identifiers in the candidate area list are updated accordingly. In this way, the groups of adjacent cells in the comparison mask define the candidate areas, which are identified in the candidate area list.

The importer now performs a loop for processing the candidate areas. The loop begins at block 418, wherein a (current) candidate area is taken into account (starting from a first candidate area in any arbitrary order). The importer at block 421 verifies whether a shape of the candidate area matches a reference shape (or more). For example, the importer searches for the presence of two pairs of parallel edges of the candidate area that are perpendicular to each other (meaning that the candidate area has a generically rectangular shape). If the candidate area does not match the reference shape (i.e., the two pairs of parallel edges are not found), the importer discards the candidate area at block 424 by deasserting the candidate area's flags in the comparison mask and by removing the candidate area's identifier from the candidate area list. In this way, it is possible to avoid taking into account areas of the touch-screen that are covered by physical objects unlikely to represent the paper document (for example, a hand or the arm of the participant). The process then continues to block 427. The same point is instead reached directly from the block 421 (without performing any operation) when the candidate area matches the reference shape. At this point, a test is made wherein the importer verifies whether a last candidate area has been processed. If the last candidate area has not been processed, the process returns to the block 418 to repeat the same operations on a next candidate area.

Conversely, once all the candidate areas have been processed, the loop is exited by descending into block 430. The importer now commands the touch-screen driver to display a visual mark close to each candidate area (as indicated in the candidate area list); for example, a red line around each candidate area's contour (as indicated in the comparison mask) with a flushing point at its upper-left corner (as indicated in the candidate area list). In this way, the participant is prompted to select the object area among multiple candidate areas or to confirm the object area for a single candidate area. In response thereto, the importer discards any other (unselected) candidate areas by deasserting the flags of the other candidate areas in the comparison mask and by removing identifiers of the other candidate areas from the candidate area list. At the same time, the importer commands the touch-screen driver to remove the visual marks of the unselected candidate areas as a feedback for the participant.

At this point, a (new) object image is acquired of the object area. For this purpose, the importer at block 433 determines a contour area of the touch-screen enclosing the object area. For example, the contour area is identified in the comparison mask by the smallest (rectangular) sub-matrix thereof comprising all the cells of the object area (i.e., having the corresponding flag that are asserted), hereinafter referred to as object mask. Continuing to block 436, the importer commands the camera driver to acquire a (new) contour image of the contour area. For example, as above each digital camera is steered and focused to acquire a digital image representing a corresponding portion of the contour area. The image processor then combines the digital images acquired by the different digital cameras into the desired contour image (defined by a matrix of cells with the same size as the object mask). The camera driver then stores the contour image so obtained into the digital image repository. The digital images are acquired by the digital cameras, and then the resulting contour image (from which the object image will be extracted), has a resolution higher than the resolution of the scan image; for example, equal to 2-100 times, preferably 5-50 times and still more preferably 10-30 times, such as 20 times (for example, 80-100% of the maximum resolution of the digital cameras, such as 1.000-20.000×1.000-20.000 pixels). In this way, the contour image has the resolution required to represent any details of the paper document (for example, enough to read printed text). Nevertheless, the contour image may be obtained in a relatively short time (for example, a few seconds) since the contour image only relates to a small portion of the touch screen. The importer then extracts the object image from the contour image (in the digital image repository) at block 439. For this purpose, the object mask is sub-sampled or expanded to make the object mask of the same size as the contour image. At this point, the contour image is multiplied cell-by-cell by the object mask. As a result, the pixel values of the contour image inside the object area are preserved, whereas the other pixel values thereof are zeroed.

A test is now made at block 442, wherein the importer verifies whether any obstruction was present of the object area; i.e., any obstacle that obstructed the view of the paper document during the acquisition of the contour image. For this purpose, the importer compares the object image with the corresponding portion of the scan image. For example, at a first verification of the obstruction, a reference (digital) image is generated (with the same reference image that is then used at any further verification of the obstruction). For this purpose, the object mask is sub-sampled or expanded to make the object mask of the same size as the scan image. The portion corresponding to the object mask is extracted from the scan image and then the portion is multiplied cell-by-cell by the object mask. In this way, the pixel values of the scan image inside the object area are preserved, whereas the other pixel values thereof (outside the object area but inside the contour area) are zeroed. In any case, the object image (in one embodiment, after applying the same smoothing algorithm as above) is sub-sampled to make the object mask the same size as the reference image. The cells of the object image significantly differing from the cells of the reference image are determined (i.e., when their difference exceeds a threshold, for example, again equal to 0-2% of a maximum value thereof). The object image is deemed different from the reference image when the number of these differing cells reaches a threshold (for example, equal to 5-10% of the total number of these differing cells). In this case, it may be inferred that an obstacle (for example, the hand of the participant used to select the object area) obstructed the view of the paper document during the acquisition of the contour image. When the obstruction is detected, the importer at block 445 causes the touch-screen driver to output a warning on the touch-screen requesting the participant to clear the object area (for example, by displaying a corresponding message in a pop-up window together with a beep). The process then returns to the block 433 to repeat the same operations (in order to re-acquire the contour image and then the object image) after a delay (for example, 2-5 s) allowing the participant to remove the obstruction. Conversely, if no obstruction is detected (meaning that the object image correctly represents the paper document) the flow of activity descends into block 472.

In the semi-automatic mode, the identification of the object area (and then the obtaining of the object image) requires a reduced manual intervention by the participant (down to no identification of the object area when no confirmation is required in case of a single candidate area).

With reference instead to block 448 (manual mode), the importer prompts the participant to select a scan area (in the touch-screen) that encloses the object area wherein the paper document is placed (for example, by outputting a corresponding message in a pop-up window). The process passes to block 451 as soon as the importer receives a notification from the touch-screen driver that a significant line (for example, with a length higher than a threshold, such as 5-10 cm) has been drawn on the touch-screen. At this point, the importer determines a selection line defined by a closed line corresponding to the drawn line. For example, when the drawn line crosses itself, the selection line is defined along a drawing direction of the drawn line starting from the drawn line's first crossing point until the same first crossing point is reached again, whereas when the drawn line does not crosses itself the selection line is defined by joining the selection line's two ends. The importer identifies a selection area of the touch-screen as a portion thereof that is enclosed within the selection line. The importer then creates a selection mask defined by a matrix of cells having the same size as the smallest (rectangular) sub-matrix of the displayed image comprising the selection area. Each cell of the selection mask stores a flag that is asserted when the corresponding pixel is inside the selection area or is deasserted otherwise.

At this point, a (new) scan image is acquired of a scan area of the touch-screen corresponding to the selection area. For this purpose, the importer at block 454 determines the scan area corresponding to the same smallest sub-matrix of the displayed image comprising the selection area. Continuing to block 457, the importer commands the camera driver to acquire the scan image. For example, as above each digital camera is steered and focused to acquire a digital image representing a corresponding portion of the scan area. The image processor then combines the digital images acquired by the different digital cameras into the desired scan image (so as to represent the whole scan area). The camera driver then stores the scan image so obtained into the digital image repository. The digital images acquired by the digital cameras, and then the resulting scan image (from which the object image will be extracted), have a high resolution (for example, the same as the resolution of the contour image in the semi-automatic mode) required to represent any detail of the paper document. However, the scan image may now be obtained in a relatively short time (for example, a few seconds) since the scan image only relates to a small portion of the touch screen.

A test is now made at block 460, wherein the importer verifies whether any obstruction was present of the paper document, i.e., any obstacle that obstructed its view during the acquisition of the scan image. For this purpose, the importer compares a peripheral portion of the scan image (defined by the portion of the scan area outside the selection area) with the corresponding portion of the displayed image. For example, at a first verification of the obstruction, a reference (digital) image is generated (with the same reference image that is then used at any further verification of the obstruction). For this purpose, the portion corresponding to the scan area is extracted from the displayed image (in the local shared documents repository), and then the portion is multiplied cell-by-cell by a negated selection mask obtained from the selection mask by inverting the selection mask's flags. In this way, the pixel values of the displayed image inside the scan area but outside the selection area are preserved, whereas the other pixel values thereof (inside the selection area) are zeroed. In any case, the scan image (possibly after applying the same smoothing algorithm as above) or the reference image is sub-sampled to make the scan image and the reference image the same size. The cells of the peripheral portion of the scan image (i.e., whose pixel values in the reference image are different from zero) significantly differing from the cells of the reference image are determined (i.e., when their difference exceeds a threshold; for example, again equal to 0-2% of a maximum value thereof). The peripheral portion of the scan image is deemed different from the reference image when the number of these differing cells reaches a threshold (for example, again equal to 5-10% of the total number of these differing cells). In this case, it may be inferred that an obstacle (for example, the hand of the participant used to draw the line defining the selection area) obstructed the view of the peripheral portion of the scan area during the acquisition of the scan image, and then might have obstructed the view of the paper document (in the selection area) as well. When the obstruction is detected, the importer at block 463 causes the touch-screen driver to output a warning on the touch-screen requesting the participant to clear the scan area (for example, again by displaying a corresponding message in a pop-up window together with a beep). The process then returns to the block 457 to repeat the same operations (in order to re-acquire the scan image) after a delay (for example, again 2-5 s) allowing the participant to remove the obstruction. Conversely, if no obstruction is detected (meaning that the scan image correctly represents the paper document inside the scan image) the flow of activity descends into block 466.

At this point, the importer compares the scan image against the corresponding portion of the displayed image (hereinafter referred to as displayed sub-image) to identify the object area of the touch-screen covered by the paper document. For example, as above the (possibly smoothed) scan image or the displayed sub-image is sub-sampled to make the scan image and the displayed sub-image the same size and the scan image and the displayed sub-image are possibly further sub-sampled to improve the robustness and to reduce the computation time. An object mask is generated. The object mask is defined by a matrix of cells with the same size as the scan image/displayed sub-image, with each cell storing a flag that is asserted when the corresponding pixel value of the scan image significantly differs from the corresponding pixel value of the displayed sub-image (i.e., their difference exceeds a threshold, for example, again equal to 0-2% of a maximum value thereof) or is deasserted otherwise). The full-size of the object mask corresponding to the original size of the scan image is then restored. In this way, the (adjacent) cells of the object mask whose flags are asserted identify the object area. Continuing to block 469, the importer generates the object image (representing the paper document) by multiplying the scan image cell-by-cell by the object mask. As a result, the pixel values of the scan image inside the object area are preserved, whereas the other pixel values thereof are zeroed. The flow of activity then descends into block 472.

In the manual mode, the object image is obtained directly from the scan image, and then in a very fast way.

With reference now to block 472 (wherein the flow of activity merges after the object image has been obtained in either the semi-automatic mode or the manual mode), the importer generates a (new) digital document representing the paper document from the object image. For example, the representation of the paper document in the object image is rotated by the smaller rotation angle (clockwise or counter-clockwise around a rotation corner thereof) that is required to align its parallel edges with the touch-screen, and then it is saved into a corresponding (new) digital document. The importer at block 475 then adds the new digital document to the local shared document repository, in association with an indication of a position of the paper document on the touch-screen (at its acquisition), for example, defined by its rotation corner and rotation angle.

The process continues to block 478, wherein the touch-screen driver detects the change of the local shared document repository caused by the addition of the new digital document. As a consequence, the touch-screen driver refreshes the touch-screen by adding the representation of the paper document (defined in the new digital document) at the corresponding position (defined by its rotation corner and rotation angle). At the same time, the tele-conference agent as well detects the same change of the local shared document repository caused by the addition of the new digital document. As a consequence, the tele-conference agent transmits the change to the tele-conference manager that replicates the new digital document on the touch-screens of the other participants to the tele-conference. Moreover, the importer notifies the tele-conference agent that the importing of the paper document has been completed, so as to cause the tele-conference agent to restore the possibility of updating the shared documents on the touch-screens of all the participants to the tele-conference.

At this point, the importer at block 481 commands the touch-screen driver to display a highlighting around the paper document on the touch-screen (for example, a flushing line enclosing it) to notify the participant that the paper document has been imported in the tele-conference and to prompt the participant to remove the paper document from the touch-screen. The importer then enters an idle loop at block 484 waiting for the removal of the paper document from the touch-screen. For example, for this purpose the importer continually commands the camera driver to acquire a (new) verification (digital) image of the object area (for example, every 10-100 ms). In this case as well, each digital camera is steered and focused to acquire a digital image representing a corresponding portion of the object area. The image processor then combines the digital images acquired by the different digital cameras into the desired verification image. The camera driver then stores the verification image so obtained into the digital image repository. The digital images acquired by the digital cameras, and then the resulting verification image, have a relatively low resolution (for example, the same as the resolution of the scan image of the semi-automatic mode), since this verification image is only used to monitor a position of the paper document on the touch-screen. At a first iteration, the importer saves the verification image as a start image (representing the paper document that covers the same representation of the new digital document in the touch-screen). At each next iteration, the importer compares the verification image with the start image (as above). As soon as the verification image differs from the start image, the importer detects a beginning of the removal of the paper document (since a portion of the representation of the new digital document in the touch screen is now covered by a different portion of the paper document). Once the verification image returns equal to the start image, the importer detects a completion of the removal of the paper document (since the whole representation of the new digital document, equal to the paper document, is now displayed on the touch screen). When this occurs, the idle loop is exited by descending into block 487. At this point, the importer commands the touch-screen driver to delete the highlighting around the paper document on the touch-screen. The process then returns to the block 403 waiting for the submission of a (next) import request.

In order to satisfy local and specific requirements, a person skilled in the art may apply many logical and/or physical modifications and alterations to the present invention. More specifically, although this disclosure has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present invention may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relation (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for importing information in a computing system. However, the information may be of any type (for example, texts, tables, drawings, any combination thereof). Moreover, the information may be imported in any computing system, even not implementing a collaborative application (for example, in a stand-alone software application for use by a single person).

In an embodiment, an information content stored in the computing system is displayed on each of one or more screens of the computing system provided in corresponding locations. However, the information content may be of any type (for example, files, databases) and it may be stored in any way in the computing system (for example, in a cloud storage). The information content may be displayed on any number and type of screens, even not of touch type (for example, standard display panels), in any number and type of locations (for example, offices, homes, public facilities) either local or remote one to another.

In an embodiment, an import request is received by the computing system in a current one of the locations for importing a digital representation of a physical object placed on a current one of the screens in the current location. However, the import request may be received in any way (for example, by clicking with a mouse or by pressing a physical button) by any component of the computing system (for example, a distinct computer connected to the screen), even automatically (for example, by monitoring the screen to detect the placing of the physical object thereon). The physical object may be of any type (for example, a page of a book, a printed sheet, a hand-written sheet, a 3D object) and it may be placed on the screen in any way (for example, with the screen that is slightly slanted).

In an embodiment, a first digital image is acquired at least partially representing the current screen by one or more digital cameras arranged above the current screen. However, the first digital image may be of any type (for example, of gray-scale type) and it may represent either the whole current screen or only a part thereof. The first digital image may be acquired in any way (for example, in one shot or combining multiple digital images representing either different areas or the same area). The digital cameras may be in any number and of any type (for example, web cams) and they may be arranged in any way above the screen (for example, mounted on stands or walls).

In an embodiment, an object digital image is obtained representing an object area of the current screen, which is covered by the physical object. However, the object area may be obtained in any way, either from the scan image or from any other image (see below).

In an embodiment, the object area is identified according to a comparison between the first digital image and a displayed digital image, which is displayed by the screen at an acquisition instant of the first digital image. However, the first digital image and the displayed digital image may be compared in any way to identify the object area (for example, at full resolution or on sub-sampled versions thereof, with dynamic thresholds for detecting differing pixels or groups thereof).

In an embodiment, a digital document is generated representing the physical object from the object digital image. However, the digital document may be of any type (for example, entirely in graphical form or with its text in editable form). The digital document may be generated in any way (for example, by applying filtering, OCR algorithms).

In an embodiment, the digital document is added to the information content for the displaying of the digital document on each one of the screens in correspondence to a position of the physical object on the current screen. However, the digital document may be added to the information content in any way (for example, by transmitting it remotely). The display of the digital document may be obtained in any way (for example, automatically by monitoring the information content or in response to a notification of the importing of the physical object). The display of the digital document may occur in correspondence to the position of the physical object on the current screen in any way (for example, according to a scaling factor).

In an embodiment, the screens are a plurality of screens implementing a collaborative application in the computing system. However, the screens may be in any number (comprising a single screen used by multiple users) and the screens may implement any collaborative application, even not in real-time (for example, a workgroup).

In an embodiment, each screen is comprised in a touch-screen table. However, the touch-screen may be of any type (for example, based on acoustic pulse technology) and embedded in any table (for example, with cantilever support).

In an embodiment, said step of acquiring a first digital image comprises acquiring the first digital image representing the current screen. However, the first digital image may represent the current screen in any way (for example, by shooting a larger area comprising it, exactly it or only a portion thereof wherein the physical objects may be placed).

In an embodiment, said step of obtaining an object digital image comprises identifying one or more candidate areas for the object area according to the comparison between the first digital image and the displayed digital image. However, the candidate areas may be in any number and the candidate areas may be identified in any way (for example, discarding the ones with a size below a threshold).

In an embodiment, the object area is set to a selected one of the candidate areas. However, the setting of the object area may be performed in any way (for example, completely manually, completely automatically by ranking the candidate areas according to one or more pre-defined criteria (like shape, size) or with any combination thereof).

In an embodiment, said step of identifying one or more candidate areas comprises selecting the object area among the candidate areas according to a comparison of a shape of each candidate area with at least one reference shape. However, the reference shapes may be in any number and of any type (for example, defined by their profile, size or any combination thereof). The candidate areas may be compared with the reference shapes in any way (for example, by applying image recognition techniques). In any case, this comparison operation may be used to select the object area automatically, to limit the number of candidate areas for a next manual selection or this comparison operation may be omitted at all.

In an embodiment, the step of identifying one or more candidate areas comprises prompting a user of the current screen to select the object area among the candidate areas. However, the object area may be selected in any way (for example, in a corresponding list). In any case, this prompting operation may be performed always, only when multiple candidate areas are found or this prompting operation may be omitted at all when a single candidate area is found.

In an embodiment, said step of obtaining an object digital image comprises acquiring the object digital image representing the object area by the digital cameras. However, the object digital image may be of any type and it may be acquired in any way (either the same or different with respect to the first digital image), directly to represent the object area or from any contour digital image representing any contour area enclosing the object area (for example, slightly larger than it). In any case, the possibility of generating the object digital image from the first digital image in the semi-automatic mode as well is not excluded.

In an embodiment, the object digital image has a resolution higher than a resolution of the first digital image. However, the object digital image and the first digital image may have any resolutions (either in absolute terms or in relative terms, with each one of the images that may be lower, the same or higher than the other one of the images).

In an embodiment, said step of acquiring the object digital image comprises an iteration implemented by repeating the following steps.

In an embodiment, the iteration comprises verifying an obstruction of the object area according to a comparison between the object digital image and a corresponding portion of the first digital image. However, the object digital image may be compared with the corresponding portion of the first digital image in any way (either the same or different with respect to the comparison for identifying the object area). The obstruction may be determined in any way according to this comparison (for example, when a group of differing adjacent cells with a size higher than a threshold is found) or more generally according to any other criterion (for example, when the representation of another physical object is detected immediately outside the object area). In any case, this verification may also be omitted at all in a basic implementation.

In an embodiment, the iteration comprises outputting a warning for clearing the object area when the obstruction is detected. However, the warning may be of any type (for example, only of visual type, only of acoustic type or any combination thereof).

In an embodiment, the iteration comprises re-acquiring the object digital image after the outputting of said warning.

However, the object digital image may be re-acquired in any way (either the same or different with respect to a previous acquisition thereof) and at any time (for example, after a manual confirmation that the object area has been cleared).

In an embodiment, the above-mentioned steps of the iteration are repeated until the obstruction is not detected. However, the iteration may be terminated in any way (for example, by aborting the importing of the physical object after a pre-defined number of attempts to acquire the object digital image).

In an embodiment, the step of acquiring a first digital image comprises prompting a user of the current screen to select a scan area of the current screen enclosing the physical object. However, the scan area may be selected in any way (for example, by drawing multiple straight lines defining the scan area's edges, by pointing to the scan area's corners only).

In an embodiment, said step of acquiring a first digital image comprises acquiring the first digital image representing the scan area. However, the first digital image may be of any type and it may be acquired in any way (either the same or different with respect to the case of the object digital image in the semi-automatic mode), either directly to represent the scan area or from any digital image representing any area enclosing the one selected by the user (for example, slightly larger than the one selected by the user).

In an embodiment, the step of obtaining an object digital image comprises identifying the object area according to the comparison between the first digital image and a corresponding portion of the displayed digital image. However, the first digital image may be compared with the corresponding portion of the displayed digital image in any way (either the same or different with respect to the case of the semi-automatic mode).

In an embodiment, the step of obtaining an object digital image comprises generating the object digital image from the representation of the object area in the first digital image. However, the object digital image may be generated from the first digital image in any way (for example, from the first digital image as acquired or from a smoothed version thereof). In any case, the possibility of acquiring another object digital image representing the object area in the manual mode as well is not excluded.

In an embodiment, said step of acquiring the first digital image comprises an iteration implemented by repeating the following steps.

In an embodiment, the iteration comprises verifying an obstruction of the object area according to a comparison between a peripheral portion of the first digital image and a corresponding portion of the displayed digital image. However, the peripheral portion of the first digital image may be defined in any way (for example, by a frame with a pre-defined width). The peripheral portion of the first digital image may be compared with the corresponding portion of the displayed digital image in any way and the obstruction may be determined in any way according to this comparison or more generally according to any other criterion (either the same or different with respect to the case of the semi-automatic mode). In any case, this verification may also be omitted in a basic implementation.

In an embodiment, the iteration comprises outputting a warning for clearing the object area when the obstruction is detected. However, the warning may be of any type (either the same or different with respect to the case of the semi-automatic mode).

In an embodiment, the iteration comprises re-acquiring the first digital image after the outputting of the warning. However, the first digital image may be re-acquired in any way and at any time (either the same or different with respect to the case of the semi-automatic mode).

In an embodiment, the above-mentioned steps of the iteration are repeated until the obstruction is not detected. However, the iteration may be terminated in any way (either the same or different with respect to the case of the semi-automatic mode).

In an embodiment, said step of displaying the digital document comprises displaying a highlighting around the physical object on the current screen. However, the highlighting may be of any type, even not surrounding the physical object (for example, an arrow pointing to the physical object). The highlighting may be replaced by any other indication (for example, a pop-up window) or the highlighting may be omitted.

In an embodiment, said step of displaying the digital document comprises monitoring a removal of the physical object from the current screen. However, the removal of the physical object may be monitored in any way (for example, by surface photo-cells), or the removal of the physical object may be completely omitted when the highlighting is not displayed.

In an embodiment, said step of displaying the digital document comprises deleting the highlighting from the current screen in response to the removal of the physical object. However, the highlighting may be deleted in any way (for example, in response to a manual confirmation of the removal of the physical object).

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions executable by a computing system to cause the computing system to perform the same method. However, the computer program may be implemented as a stand-alone module, as a plug-in for a pre-existing software application (for example, the tele-conference application, and particularly each tele-conference agent), or even directly in the latter. In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing the above-mentioned method. An embodiment provides a system comprising a circuitry (i.e., any hardware suitably configured, for example, by software) for performing each step of the same method; particularly, an embodiment provides a system for importing information in a computing system, the system comprising a circuitry for displaying an information content being stored in the computing system on each of one or more screens of the computing system provided in corresponding locations, a circuitry for receiving an import request by the computing system in a current one of the locations for importing a digital representation of a physical object placed on a current one of the screens in the current location, a circuitry for acquiring a first digital image at least partially representing the current screen by one or more digital cameras arranged above the current screen, a circuitry for obtaining an object digital image representing an object area of the current screen being covered by the physical object, the object area being identified according to a comparison between the first digital image and a displayed digital image being displayed by the current screen at an acquisition instant of the first digital image, a circuitry for generating a digital document representing the physical object from the object digital image, and a circuitry for adding the digital document to the information content for the displaying of the digital document on each one of the screens in correspondence to a position of the physical object on the current screen.

However, the method may also be carried out on a system based on a different architecture (for example, a local, wide area, global, cellular or satellite network), and exploiting any type of (wired and/or wireless) connections, or even in a stand-along computer. It would be readily apparent that it is also possible to deploy the same solution as a service that is accessed through a network (such as in the Internet).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes one or more computer readable hardware storage devices having computer readable program code stored therein, said program code containing instructions executable by one or more processors of a computing system (or computer system) to implement the methods of the present invention.

A computing system (or computer system) of the present invention includes one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for importing information in a computing system, said method comprising:
    displaying an information content being stored in the computing system on each screen of one or more screens of the computing system provided in corresponding locations;
    receiving an import request by the computing system in a current location for importing a digital representation of a physical object placed on a current screen of the one or more screens in the current location;
    acquiring a scan digital image at least partially representing the current screen by one or more digital cameras arranged above the current screen in the current location;
    obtaining an object digital image representing an object area of the current screen being covered by the physical object, said object area being identified according to a comparison between the scan digital image and a displayed digital image being displayed by the current screen at an acquisition instant of the scan digital image;
    generating a digital document representing the physical object from the object digital image; and
    adding the digital document to the information content for displaying the digital document on each screen of the one or more screens in correspondence to a position of the physical object on the current screen;
    ascertaining whether an obstruction of the object area exists, said ascertaining based on a comparison between the object digital image and a corresponding portion of the scan digital image; and
    if said ascertaining ascertains that the obstruction of the object area exists, then outputting a warning for clearing the object area, re-acquiring the object digital image after said outputting the warning, and iteratively repeating said ascertaining, said outputting the warning, and said re-acquiring the object digital image until said ascertaining ascertains that the obstruction of the object area does not exist,
    wherein said ascertaining ascertains, at least once, that the obstruction of the object area exists.

2. The method of claim 1, wherein the one or more screens are a plurality of screens implementing a collaborative application in the computing system.

3. The method of claim 1, wherein each screen is in a touch-screen table.

4. The method of claim 1,
    wherein said acquiring the scan digital image comprises: acquiring the scan digital image totally representing the current screen, and
    wherein said obtaining the object digital image comprises: identifying one or more candidate areas for the object area according to the comparison between the scan digital image and the displayed digital image, said object area being set to a selected candidate area of the one or more candidate areas.

5. The method of claim 4, wherein said identifying one or more candidate areas comprises:
    selecting the object area among the one or more candidate areas according to a comparison of a shape of each candidate area with at least one reference shape.

6. The method of claim 4, wherein said identifying one or more candidate areas comprises:
    prompting a user of the current screen to select the object area from among the one or more candidate areas.

7. The method of claim 4, wherein said obtaining the object digital image comprises:
    acquiring the object digital image representing the object area by the digital cameras.

8. The method of claim 7, wherein the object digital image has a resolution higher than a resolution of the scan digital image.

9. The method of claim 1,
    wherein said acquiring the scan digital image comprises:
        prompting a user of the current screen to select a scan area of the current screen enclosing the physical object; and acquiring the scan digital image representing the scan area, and wherein said obtaining an object digital image comprises:
identifying the object area according to the comparison between the scan digital image and a corresponding portion of the displayed digital image; and
generating the object digital image from a representation of the object area in the scan digital image.

10. The method of claim 9, wherein said acquiring the scan digital image comprises:
ascertaining whether an obstruction of the object area exists, said ascertaining based on a comparison between a peripheral portion of the scan digital image and a corresponding portion of the displayed digital image; and
if said ascertaining ascertains that the obstruction of the object area exists, then outputting a warning for clearing the object area, re-acquiring the scan digital image after said outputting the warning, and iteratively repeating said ascertaining, said outputting the warning, and said re-acquiring the scan digital image until said ascertaining ascertains that the obstruction of the object area does not exist.

11. The method of claim 1, wherein said displaying the digital document comprises:
displaying a highlighting around the physical object on the current screen;
monitoring a removal of the physical object from the current screen; and
deleting the highlighting from the current screen in response to the removal of the physical object.

12. A computer program product, comprising a computer readable hardware storage device having program instructions stored therein, said program instructions executable by a computing system to implement a method for importing information in the computing system, said method comprising:
displaying an information content being stored in the computing system on each screen of one or more screens of the computing system provided in corresponding locations;
receiving an import request by the computing system in a current location for importing a digital representation of a physical object placed on a current screen of the one or more screens in the current location;
acquiring a scan digital image at least partially representing the current screen by one or more digital cameras arranged above the current screen;
obtaining an object digital image representing an object area of the current screen being covered by the physical object, said object area being identified according to a comparison between the scan digital image and a displayed digital image being displayed by the current screen at an acquisition instant of the scan digital image;
generating a digital document representing the physical object from the object digital image; and
adding the digital document to the information content for the displaying of the digital document on each one of the one or more screens in correspondence to a position of the physical object on the current screen;
ascertaining whether an obstruction of the object area exists, said ascertaining based on a comparison between the object digital image and a corresponding portion of the scan digital image; and
if said ascertaining ascertains that the obstruction of the object area exists, then outputting a warning for clearing the object area, re-acquiring the object digital image after said outputting the warning, and iteratively repeating said ascertaining, said outputting the warning, and said re-acquiring the object digital image until said ascertaining ascertains that the obstruction of the object area does not exist,
wherein said ascertaining ascertains, at least once, that the obstruction of the object area exists.

13. The computer program product of claim 12, wherein the one or more screens are a plurality of screens implementing a collaborative application in the computing system.

14. The computer program product of claim 12, wherein each screen is in a touch-screen table.

15. The computer program product of claim 12,
wherein said acquiring the scan digital image comprises:
acquiring the scan digital image totally representing the current screen, and
wherein said obtaining the object digital image comprises:
identifying one or more candidate areas for the object area according to the comparison between the scan digital image and the displayed digital image, said object area being set to a selected candidate area of the one or more candidate areas.

16. A computing system, comprising one or more processors, one or more memories, and one or more computer readable hardware storage devices, said one or more hardware storage device containing program code executable by the one or more processors via the one or more memories to implement a method for importing information in the computing system, said computing system comprising:
displaying an information content being stored in the computing system on each screen of one or more screens of the computing system provided in corresponding locations;
receiving an import request by the computing system in a current location for importing a digital representation of a physical object placed on a current screen of the one or more screens in the current location;
a circuitry for acquiring a scan digital image at least partially representing the current screen by one or more digital cameras arranged above the current screen;
a circuitry for obtaining an object digital image representing an object area of the current screen being covered by the physical object, said object area being identified according to a comparison between the scan digital image and a displayed digital image being displayed by the current screen at an acquisition instant of the scan digital image;
a circuitry for generating a digital document representing the physical object from the object digital image; and
a circuitry for adding the digital document to the information content for the displaying of the digital document on each one of the one or more screens in correspondence to a position of the physical object on the current screen;
ascertaining whether an obstruction of the object area exists, said ascertaining based on a comparison between the object digital image and a corresponding portion of the scan digital image; and
if said ascertaining ascertains that the obstruction of the object area exists, then outputting a warning for clearing the object area, re-acquiring the object digital image after said outputting the warning, and iteratively repeating said ascertaining, said outputting the warning, and said re-acquiring the object digital image until said ascertaining ascertains that the obstruction of the object area does not exist, wherein said ascertaining ascertains, at least once, that the obstruction of the object area exists.

17. The computing system of claim 16, wherein the one or more screens are a plurality of screens implementing a collaborative application in the computing system.

18. The computing system of claim 16, wherein each screen is in a touch-screen table.

19. The computing system of claim 16,
wherein said acquiring the scan digital image comprises: acquiring the scan digital image totally representing the current screen, and wherein said obtaining the object digital image comprises: identifying one or more candidate areas for the object area according to the comparison between the scan digital image and the displayed digital image, said object area being set to a selected candidate area of the one or more candidate areas.

\* \* \* \* \*